June 27, 1961
A. M. MILLS
2,990,132
LOCKING DEVICE FOR REELS AND THE LIKE AND
REELS EMBODYING SAME
Filed Aug. 17, 1959
2 Sheets-Sheet 1
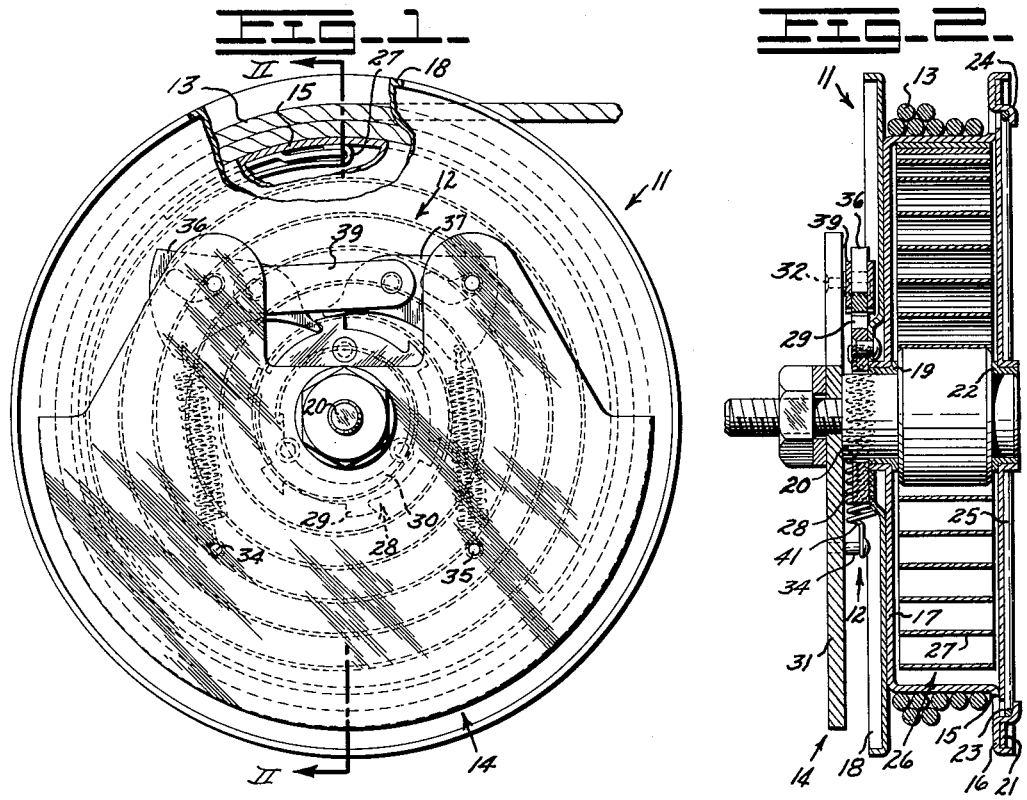
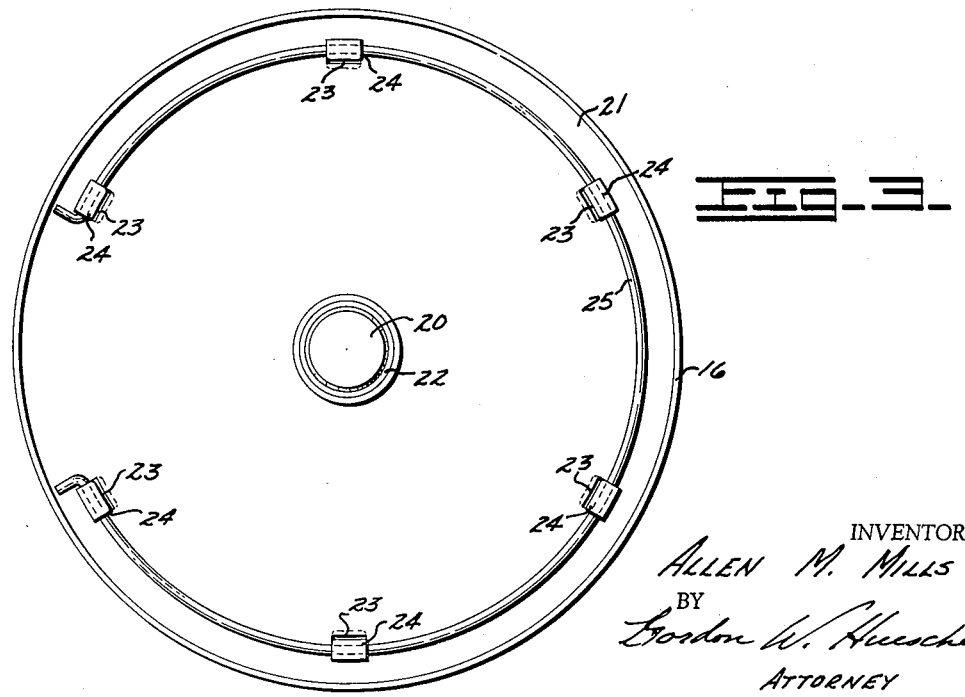
INVENTOR.
ALLEN M. MILLS
BY
Gordon W. Hueschen
ATTORNEY

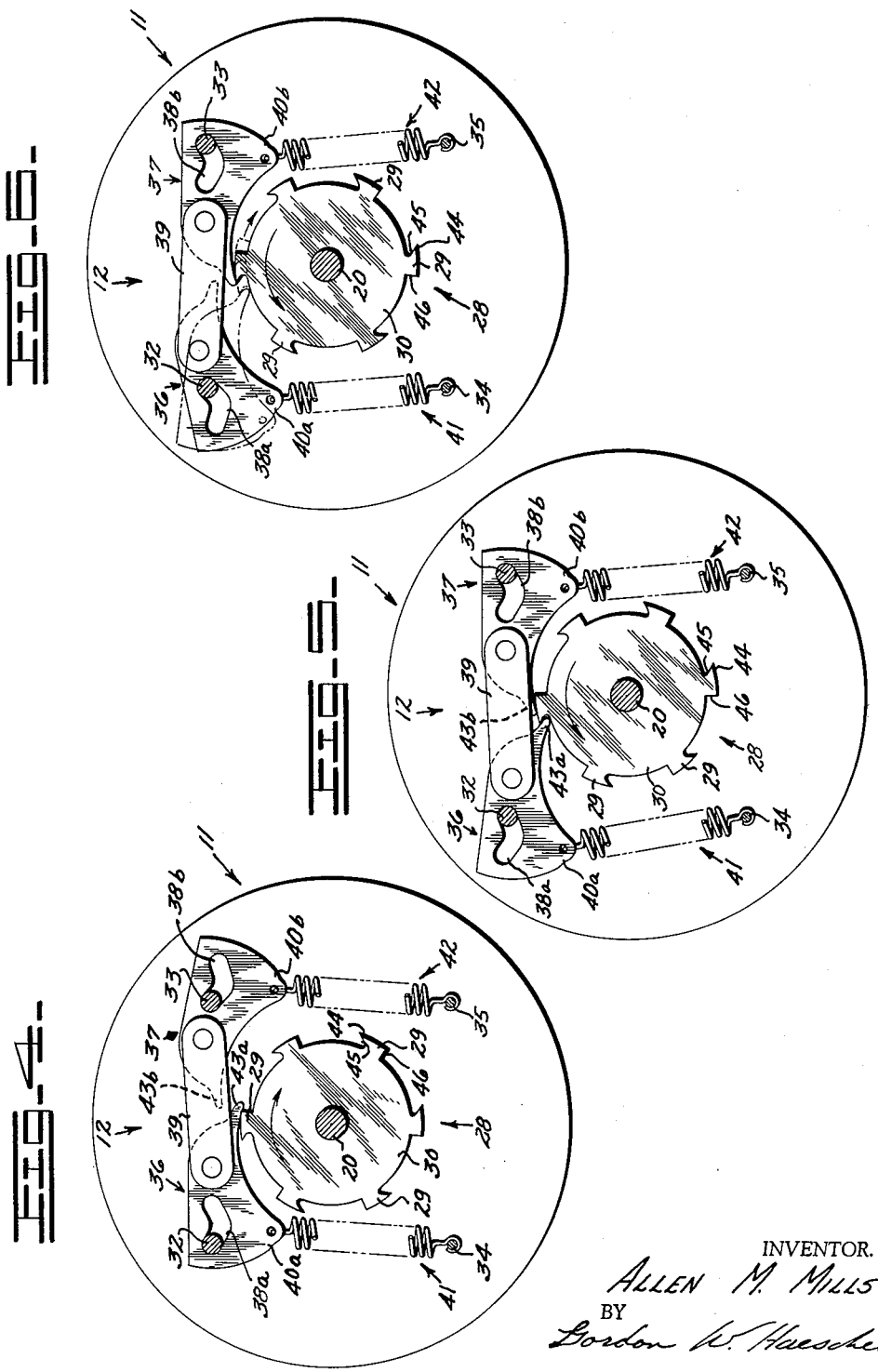

United States Patent Office 2,990,132
Patented June 27, 1961

2,990,132
LOCKING DEVICE FOR REELS AND THE LIKE
AND REELS EMBODYING SAME
Allen M. Mills, Kalamazoo, Mich., assignor to General
Tool of Kalamazoo Inc., Kalamazoo, Mich., a corporation of Michigan
Filed Aug. 17, 1959, Ser. No. 834,078
8 Claims. (Cl. 242—107.7)

The present invention is directed to a lock control mechanism for take-up reels and more particularly to a simple mechanical structure which accomplishes lock control and selective release in a very positive manner so as to greatly simplify and improve take-up reel structures. The invention is also directed to reels incorporating such a mechanism. Still more particularly the present invention is directed to a system of substantially identical opposed and articulated pawls, each spring biased, and each shiftable through fulcrum shifting action so as to accomplish smooth sequencing, positive locking, and selective release while occupying a minimum amount of space in direct adjacent relationship to the spool, drum, or reel served thereby.

Take-up reels are extensively used, for example, in gasoline pumps so that the delivery hose may be reeled out and selectively extended and locked against take-up or rewind while gasoline is being delivered. Then the take-up reel must be unlocked so that the hose, for example, is rewound on the spool, reel, or drum in accord with, for example, spring stored energy. Other applications of take-up reels have been found, for example in devices for retractably securing or storing wire, sheet material, tubing, and the like. A very common usage of such structures is found in tire inflation devices where a hollow conduit served by compressed air is stored ready for extension and use. Substantially all of such devices have utilized a wide variety of brake or control mechanisms so that a selected amount of stored line or hose could be reeled off against a spring bias and then the control mechanism locks against retraction so that during use the retraction or return is ineffective until release is desired by the operator.

In order to achieve a more or less positive lock, the tendency in the art has been moving in the direction of increasing complexity of control mechanism as exemplified in United States Letters Patent 2,494,525 to A. B. Steuart. Attendant sacrifices in economy, compactness, and mechanical stability have resulted along with increased size of control mechanism and increased bulkiness of the overall application. Much of this was considered necessary as the size and capacity of take-up reels was extended. Brake type devices involving friction for locking have been objected to because of the wear on the brake bands and the non positive locking or slippage.

The present invention is therefore directed to a control mechanism for take-up reels that is simple in construction, positive in operation, rugged in service while occupying a minimum amount of space in adjacent substantially planal relationship to the reel, drum or spool.

Another object of the invention is the provision of a new control mechanism utilizing a pair of substantially identical opposed and articulated pawls operating in association with a simple but novel ratchet structure, and each of the pawls being resiliently biased and selectively fulcrumed in accord with the articulation to accomplish the positive result sought in take-up reel controls.

Still another object of the present invention is the provision of a new and greatly improved combination take-up reel and control therefor, adaptable to a wide variety of take-up reel applications and amenable to left or right installation by the simple reversal of the ratchet member.

Other objects, including extended service life, simple maintenance and avoidance of jamming will become increasingly apparent to those skilled in the art as the description proceeds:

In the drawings:

FIGURE 1 is a side elevation view of the articulated pawl lock and release structure shown mounted on the spring loaded take-up reel or spool.

FIGURE 2 is a front elevation cross section view of the structure, shown in FIGURE 1 and taken on line II—II thereof.

FIGURE 3 is a side elevation view of the opposite side of the structure shown in FIGURE 1 and illustrating the end plate retaining structure of said reel.

FIGURE 4 is a detail elevation view of the articulated pawl lock and release structure as it appears during the unwinding of spooled material on the drum, unwinding action moving the ratchet element in a clockwise direction as illustrated.

FIGURE 5 is a detail elevation view indicating that upon release of unwinding force, the ratchet, secured to the drum or spool, reverses its direction in accord with the rewind bias in the reel, and shows the lock pawl in lock engagement with the ratchet thereby locking against take-up.

FIGURE 6 is a detail elevation view as in FIGURE 5 but illustrating that upon slight unwinding force upon the drum and release of that force the articulated pawl structure is freed from lock engagement with the drum secured ratchet and full take-up or rewind of the spool is accomplished.

General description

In general the invention comprises a lock or latch structure positioned in planal relation adjacent to one side of a take-up reel, drum, or spool. The reel, drum, or spool is served as by an internal spring bias tending to return material unwound from the spool to rewind on the spool. If this structure were employed alone, the spring bias, increasing in strength with the extension of material from the drum, would hamper the use of the stock withdrawn inasmuch as the bias to return the stock would apply steady tension on the stock. The latch mechanism or control structure is therefore integrated with the function and structure of the take-up reel so as to relieve the effect of the bias when a selected length of stock has been unwound from the reel and tension is released. This is accomplished by the securing of a unique ratchet to the side of the drum. The ratchet is coaxial with the drum and rotates in accord with drum rotation. A control plate, which may comprise the housing for the entire reel and support structure, provides support for a pair of ratchet engageable pawls, the pawls being in articulated relationship, each being fulcrumed shiftably on fixed pivots on the control or support plate and each being biased so as to be urged into and out of contact with the ratchet depending upon the fulcrum position of the pawls. In operation, withdrawal of the stock from the reel or drum rotates the drum thereby rotating the ratchet unobstructed by either of the pawls while by reason of the indicated articulation one of the pawls is prepared to immediately block the return of the ratchet (and attached reel) in a rewind direction. This blocks rewind and the spring bias in the reel urging return. This both secures the locking pawl in engagement with the ratchet and by reason of overcoming the pawl bias, shifts the fulcrum position of both pawls, thereby preparing the lock pawl for selected release. Release is then accomplished by slight unwind and subsequent and constant return, since this serves to release the lock pawl, its pawl bias in the new fulcrum position rocking the pawl out of ratchet engagement so as to accomplish smooth rewind. This sequencing is smooth, trouble free, and with very positive lock. When rewind is accomplished the over-run pawl is biased into engagement with the ratchet at rest ready to again be shifted on its fulcrum and by reason of the articulation to also shift the lock pawl fulcrum position when stock is unwound from the reel, thereby arming the locking pawl for locking engagement.

*Specific description*

Referring more particularly to the drawings, the invention is best first understood by reference to FIGURES 1, 2 and 3 illustrating the take-up reel 11 integrated with the control mechanism 12, the reel 11, and control mechanism 12 serving to store stock 13. The control or support plate 14 supports a part of the control mechanism 12 and as will be appreciated may be integral with an entire housing for take-up reel 11 and mechanism 12. The take-up reel 11 comprises a drum portion 15 upon which the stock 13 is wound. The drum portion 15 is provided with an outer flange 16, and an inner web 17. A flange plate 18 is secured to the web 17, as by welding for example, thereby forming, with the drum portion 15, a spool or reel 11 which is open on one side. The web 17 and flange plate 18 retain a bearing 19. A shaft 20 is inserted through the bearing 19 and thus the drum 15 is suitably journalled on one side. The open side of the drum portion 15 is provided with a disc-like cover plate 21 having a central opening therethrough and retaining a bearing 22. Peripherally positioned openings 23 in the cover plate 21 are in register with retainer posts 24 extending from said flange portion 16 of said drum 15. Upon assembly the posts 24 extend through the openings 23. A spring clip 25 impinges on the posts 24 in biased relationship thereby securing said cover plate 21 to the drum flange 16 and retaining said cover 21 in bearing relationship to the shaft 20. By snap action, the clip 25 is easily removed and the cover plate 21 is disassociated from the drum flange 16 for repair or disassembly of the drum 15. Inside of the drum 15 is a bias 26, usually in the form of a spiral spring 27 secured at one end to the shaft 20, and at the other end to the movable drum 15. The cover plate 21 thus provides a complete housing for the spring 27.

Secured coaxially at the reel 11 is ratchet member 28 which rotates in accord with reel rotation. The teeth 29 on the ratchet 28 are sheep-foot in form as indicated in FIGURE 1 and better illustrated in FIGURES 4, 5 and 6 and extend radially from the ratchet body 30. In adjacent spaced planal relationship to the ratchet 28 is a support or control plate 31. The control plate 31 may comprise, for example, a part of a housing for the entire reel and lock assembly. The support or control plate 31 is transverse of the shaft 20 and preferably provides a support for the shaft 20 as shown best in FIGURE 2. The support plate 31 is provided with a pair of spaced apart pivot pins 32 and 33 located radially and symmetrically outboard from the ratchet 28. As will be seen the pivot pins 32 and 33 provide fixed pivot position for a moving or shifting fulcrum arrangement. Directly beneath each of the pivot pins 32 and 33 are hangers 34 and 35 respectively. These hangers 34 and 35 also extend transversely from the plane of the support plate 31 and are substantially parallel axially to the pivot pins 32 and 33.

A pair of substantially identical pawls 36 and 37 are provided. The pawl 36 is the lock pawl and the pawl 37 is an overrun pawl. The pawls 36 and 37 are positioned oppositely to each other, both being shiftably pivotal on the pins 32 and 33 respectively. The shifting of the pivotal position of the pawls 36 and 37 is accomplished by reason of the shallow V cam slots 38a and 38b in each of the pawls. An articulating link 39 secured pivotally to each of the pawls 36 and 37 assures that when the lock pawl 36 is in one extreme of fulcrum position in respect to the pin 32, the other or over-run pawl 37 is in the opposite extreme of fulcrum position with respect to pin 33. Each of the pawls 36 and 37 are provided with the depending tilt control lobes 40a and 40b. The lobes 40a and 40b are maintained at all times in clearance relationship with respect to the ratchet 28 and are secured to respective bias members 41 and 42 shown as springs. As will be appreciated by reference to FIGURES 4, 5 and 6, the bias 41 and 42 subjects the pawls 36 and 37, respectively to a rocking motion about the pins 32 and 33 respectively. The rocking motion, as will be appreciated, is into and out of engagement with the ratchet depending upon the extreme of fulcrum position in each of the pawls 36 and 37. Thus assuming articulation of the pawls 36 and 37, there is always one pawl being urged into contact with the ratchet 28 and one pawl being urged out of contact with the ratchet 28. Each pawl 36 and 37 is provided with a ratchet engaging nose 43a and 43b.

With reference to FIGURES 4, 5 and 6 the shape of the nose 43a and 43b is best related as to the function in lock pawl 36 of locking ratchet 28 against counterclockwise motion by substantially mating engagement with any one of the teeth 29. In the sheep's-foot form of the teeth 29, the toe portion 44 secures the nose 43 in the pocket 45. The heel 46 of each tooth 29 when the ratchet 28 is moving in a clockwise direction, as shown, over-runs the pawl 37 and overcomes the bias 42 applied to pawl 37 thereby shifting the fulcrum position on the pin 33. Such a shift, by reason of the articulating link 39, causes pawl 36 to correspondingly shift in fulcrum position and in obedience to the bias 41 rocks into unlock ratchet 28 engagement so long as the ratchet 28 moves in the clockwise direction. Upon reverse of direction to counterclockwise motion, the nose 43a of the lock pawl 36 immediately blocks (FIGURE 5) further rotation and shifts the fulcrum position of pawl 36 readying the bias for clearance (FIGURE 6) of the pawl 36 on relaxation of counterclockwise pressure against the ratchet.

Having thus described my invention it will be appreciated that modifications within the normal skill of the art may be made and such modifications are intended to be included herein limited only by the scope of the hereinafter appended claims. It will of course be appreciated that the device may be reversed in its operation by the simple inversion of the ratchet, and that the various wear receiving parts may be hardened as desired to resist abrasion. The lock mechanism is readily amenable to lubrication without loss of service effectiveness.

*Operation*

The operational detail FIGURES 4, 5 and 6 best illustrate the operation of the lock mechanism where the ratchet 28 is positioned to permit unwind (clockwise rotation) of the drum 15, selective locking of the ratchet 28 against rewind (counterclockwise), and selective release of the lock to allow rewind (counterclockwise).

In FIGURE 4 the reel 11 is shown unwinding against the spiral spring bias 26, thus causing a clockwise rotation of the ratchet 28. The pawl 36 is biased by the spring 41 into passing engagement with the teeth 29 of the ratchet 28 thus allowing unspooling of stock resisted only by the spiral spring 26. Pawl 37 is in the opposite pivot position by reason of the articulation between pawls and is rocked out of engagement with the ratchet by reason of spring bias 42.

When a desired amount of stock has been spooled off of the drum 15, the motion is stopped and the ratchet 28 obeying the bias of the spiral return spring 26 rotates counterclockwise, one of the teeth 29 locking over the nose 43a and pushing the lock pawl 36 into its extreme outward pivot position. This shift in fulcrum causes a corresponding shift in the fulcrum position of pawl 37 by reason of the articulation between pawls so that the bias of the spring 41 urges pawl 36 away from its lock position and the bias of spring 42 urges the pawl 37 into over-run and keeper engagement with the top of tooth 29. The bias of spring 41 is denied effectiveness because of the entrapment of the pawl 36 in the pocket 45. This effectively locks the reel 11 and drum 15 against rewind (FIGURE 5).

A slight unwinding (clockwise) motion of the ratchet 28, however, frees the pawl 36 from retention in the ratchet tooth pocket 45 and the bias of spring 41 tips the pawl 36 out of ratchet engagement thereby permitting full rewind (counterclockwise rotation). The pawl 37 continues running contact with the ratchet 28 as it continues its rewind function (FIGURE 6).

As will be appreciated, unreeling of stock 13 from the drum 15 causes engagement of the heel 46 with the pawl 37 thereby shifting the fulcrum position of pawl 37 to over-run disengaging position with attendant articulated movement in pawl 36 arming the lock mechanism for lock engagement.

The lock is positive, release is very simply accomplished, and unspooling and rewind is exceptionally smooth. The lock and reel mechanism thus described has numerous applications in the art.

Having thus described my invention and its operation I claim:

1. A selective release lock mechanism of the ratchet and pawl type, comprising: a pair of oppositely positioned substantially identical pawls each having a movable fulcrum; articulation means connecting said pawls so as to position said pawls in opposite extremes of fulcrum position; a ratchet structure lockably engageable with one of said pawls when rotated in one direction of rotation and movably over-running the other of said pawls when moving in the opposite direction of rotation, and being selectively disengageable with the first of said pawls upon slight movement in the over-run direction of rotation of said ratchet against the second of said pawls, thereby clearing the first of said pawls from said ratchet; and a resilient bias applied to each of said pawls in each of the fulcrum positions of said pawls.

2. A selective release lock mechanism of the ratchet and pawl type comprising: a ratchet; a rotatable member coaxially secured to said ratchet; a first pawl having a movable fulcrum; a second substantially identical pawl oppositely positioned from said first pawl and having a movable fulcrum; an articulating link connecting said first and second pawls so as to position said pawls in opposite extremes of fulcrum position; a bias applied to said first pawl biasing said first pawl respectively into and out of engagement with said ratchet in accord with the fulcrum position occupied by said first pawl; and a bias applied to said second pawl biasing said second pawl respectively into and out of engagement with said ratchet in accord with the fulcrum position occupied by said second pawl.

3. In a lock structure for take-up reels and the like, the combination comprising: a mounting plate; a pair of spaced apart pivot pins extending from said mounting plate and respectively designated first pivot pin and second pivot pin; a pair of spaced apart hanger members directly beneath said pivot pins; a first pawl having a cam groove therein shiftably pivotal on said first pivot pin thereby providing a movable fulcrum; a first bias member secured to said first pawl and to one of said hangers applying tension therebetween selectively biasing said first pawl in a clockwise and counterclockwise direction dependent upon the position of said first pivot pin in relationship to said first pawl; a second pawl, substantially identical to said first pawl and oppositely positioned in respect to said first pawl and said second pawl having a cam groove therein shiftably pivotal on said second pivot pin thereby providing a movable fulcrum; a second bias member secured to said second pawl and to the other of said hangers applying tension therebetween selectively biasing said second pawl in a clockwise and counterclockwise direction dependent upon the position of said second pivot pin in relationship to said second pawl; an articulating link connecting said first and seconds pawls so as to position said pawls in opposite extremes of fulcrum position; and a ratchet member in substantially the same plane as said pawls and selectively engageable with said pawls for overrun in one direction, lock in the opposite direction, and release upon movement of said ratchet in the direction of over-run rocking whichever of said pawls is in locking engagement with said ratchet member out of ratchet lock engagement.

4. A structure as set forth in claim 3 wherein said ratchet is operably connected to a resilient bias resisting rotation of said ratchet in one direction.

5. A take-up reel and lock comprising: a spool member; a resilient bias in said spool resisting rotation of said spool member in one direction of rotation; a ratchet coaxially secured to said spool; a control support panel adjacent said ratchet and in substantial parallel relationship to said ratchet; a pair of substantially identical pawls in opposed relationship pivotal and shiftable on said support panel and in planal register with said ratchet; resilient pawl bias members secured to said support panel and connected to said pawls biasing each of said pawls into and out of contact with said ratchet depending upon the pivotal position of each of said pawls; and an articulating link connecting said pawls so that one of said pawls is selectively in one extreme of pivotal position and the other of said pawls is in the other extreme of pivotal position until selectively reversed.

6. A take-up reel and lock as expressed in claim 5 wherein said spool comprises: a drum; disc-like end panels secured to said drum, one of said disc-like end members being removable from said drum; a spring clip securing said removable of said end members to said drum; and journal means on the axis of said drum.

7. In a lock structure, the combination comprising: a mounting plate; a pair of spaced apart pivot pins extending from said mounting plate and respectively designated first pivot pin and second pivot pin; a first pawl having a cam groove therein shiftably pivotal on said first pivot pin thereby providing a movable fulcrum; a first bias member selectively biasing said first pawl in a clockwise and counterclockwise direction dependent upon the position of said first pivot pin in relationship to said first pawl; a second pawl, substantially identical to said first pawl and oppositely positioned in respect to said first pawl and said second pawl having a cam groove therein shiftably pivotal on said second pivot pin thereby providing a movable fulcrum; a second bias member selectively biasing said second pawl in a clockwise and counterclockwise direction dependent upon the position of said second pivot pin in relationship to said second pawl; articulation means between said first and second pawls so as to position said pawls in opposite extremes of fulcrum position; and a ratchet member in substantially the same plane as said pawls and selectively engageable with said pawls for overrun in one direction, for lock in the opposite direction by shifting the fulcrum position of one of said pawls, and for release upon movement of said ratchet in the direction of over-run by rocking whichever of said pawls is in locking engagement with the said ratchet member out of ratchet lock engagement.

8. A lock structure comprising: an axially mounted ratchet; a control support panel adjacent said ratchet and in substantial parallel relationship to said ratchet; a pair of substantially identical pawls in opposed relationship pivotal and shiftable on said support panel and in planal register with said ratchet; resilient pawl bias members secured to said support panel and connected to said pawls biasing each of said pawls into and out of contact with said ratchet depending upon the pivotal position of each of said pawls; and an articulating link connecting said pawls so that one of said pawls is selectively in one extreme of pivotal position and the other of said pawls is in the other extreme of pivotal position until selectively reversed.

References Cited in the file of this patent

UNITED STATES PATENTS

| | | |
|---|---|---|
| 1,277,965 | Lowrey | Sept. 3, 1918 |
| 2,555,560 | Timm | June 5, 1951 |

FOREIGN PATENTS

| | | |
|---|---|---|
| 551,044 | Germany | May 25, 1932 |